United States Patent
Sehwag et al.

(10) Patent No.: US 12,443,595 B1
(45) Date of Patent: Oct. 14, 2025

(54) METHOD AND SYSTEM FOR VERIFICATION WITH LARGE LANGUAGE MODELS FOR DATA QUERYING

(71) Applicant: JPMorgan Chase Bank, N.A., New York, NY (US)

(72) Inventors: Udari Madhushani Sehwag, Jersey City, NJ (US); Yanchao Sun, Jersey City, NJ (US); Kassiani Papasotiriou, New York, NY (US); Jared Vann, London (GB); Sumitra Ganesh, Short Hills, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/763,193

(22) Filed: Jul. 3, 2024

(30) Foreign Application Priority Data

Jun. 26, 2024 (GR) ............................... 20240100465

(51) Int. Cl.
*G06F 16/242* (2019.01)
*G06F 11/34* (2006.01)
*G06F 16/2452* (2019.01)
*G06F 16/248* (2019.01)

(52) U.S. Cl.
CPC ...... *G06F 16/2425* (2019.01); *G06F 11/3409* (2013.01); *G06F 16/24522* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 10,496,640 | B2 * | 12/2019 | Taylor | G06F 16/24534 |
| 11,567,916 | B2 * | 1/2023 | Chen | G06N 20/00 |
| 11,748,634 | B1 * | 9/2023 | Kulkarni | G06F 18/21 707/722 |
| 11,809,417 | B2 * | 11/2023 | Oliner | G06F 16/906 |
| 12,222,936 | B2 * | 2/2025 | Song | G06F 16/2433 |
| 12,265,528 | B1 * | 4/2025 | Lan | G06F 16/243 |

(Continued)

OTHER PUBLICATIONS

Using LLM to select the right SQL Query from candidates (Year: 2024).*
Querying Large Language Models with SQL (Year: 2023).*

*Primary Examiner* — Kim T Nguyen
(74) *Attorney, Agent, or Firm* — Greenblum & Bernstein, P.L.C.

(57) ABSTRACT

A method and system for verifying a structured query language (SQL) query are provided. The method includes: receiving a first request to retrieve first data that is accessible via a database; identifying an intention of the first request; generating, based on the first request, a first SQL query to retrieve the first data from the database; predicting, based on the generated first SQL query, an output of the generated first SQL query; determining whether the predicted output matches the identified intention of the first request; generating, based on the determining of whether the predicted output matches the identified intention of the first request, a second SQL query to retrieve the first data that is accessible via the database, when the predicted output of the first SQL query does not match the identified intention of the first request.

17 Claims, 4 Drawing Sheets

(56) References Cited

U.S. PATENT DOCUMENTS

| | | | |
|---|---|---|---|
| 2008/0043655 A1* | 2/2008 | Lee | H04W 84/005 |
| | | | 370/310.1 |
| 2008/0043687 A1* | 2/2008 | Lee | H04W 12/069 |
| | | | 370/310.2 |
| 2023/0169114 A1* | 6/2023 | Fath | G06F 16/2433 |
| | | | 707/798 |
| 2023/0237281 A1* | 7/2023 | Yarlagadda | G06N 5/01 |
| 2024/0119046 A1* | 4/2024 | Bhaisaheb | G06F 40/30 |
| 2024/0346171 A1* | 10/2024 | Alex Namasivayam | |
| | | | G06F 21/6254 |
| 2024/0362497 A1* | 10/2024 | Grenader | G06F 16/22 |
| 2024/0403373 A1* | 12/2024 | Chao | G06F 16/9538 |
| 2024/0419803 A1* | 12/2024 | Blum | G06N 20/00 |
| 2025/0005018 A1* | 1/2025 | Liu | G06F 16/248 |
| 2025/0036859 A1* | 1/2025 | Shi | G06F 40/166 |
| 2025/0061344 A1* | 2/2025 | Haddad | G06N 5/022 |
| 2025/0077517 A1* | 3/2025 | Popescu | G06F 16/24522 |
| 2025/0086234 A1* | 3/2025 | Riva-Cambrin | G10L 15/183 |
| 2025/0094421 A1* | 3/2025 | Gongloor | G06F 16/24542 |
| 2025/0156648 A1* | 5/2025 | Skowronski | G06F 9/542 |
| 2025/0181581 A1* | 6/2025 | Amour | G06F 16/2455 |
| 2025/0200027 A1* | 6/2025 | Fu | G06F 16/24522 |
| 2025/0200281 A1* | 6/2025 | Mohanty | G06F 40/197 |

\* cited by examiner

METHOD AND SYSTEM FOR VERIFICATION WITH LARGE LANGUAGE MODELS FOR DATA QUERYING

CROSS-REFERENCE TO RELATED APPLICATIONS

This application claims priority benefit from Greek Application No. 20240100465, filed on Jun. 26, 2024 in the Greek Patent Office, which is hereby incorporated by reference in its entirety.

BACKGROUND

1. Field of the Disclosure

This technology generally relates to methods and systems for verifying a structured query language (SQL) query, and more particularly to methods and systems for verifying that a SQL query will generate the intended result and automatically revising the SQL query when the SQL query likely does not generate the intended result.

2. Background Information

There currently exist several methods for self-verification or incorporating self-verification in a Text2SQL process. Most methods fall into the following three types: 1) direct refinement by simple prompting or Chain-of-Thought (CoT) prompting; 2) after-execution verification; and 3) pre-execution verification.

For direct refinement by simple prompting or CoT prompting, a large language model (LLM) is asked to correct the generated SQL. Although such methods can fix minor and superficial errors, they usually fail to find and address logical mistakes, leading to limited performance improvement.

For after-execution verification, the generated SQL is executed in the database, and then an LLM is asked to explain the results and verify the correctness. Some methods attempt to recover from runtime error messages, while some other methods analyze the returned value and derive verification results. However, these methods require execution of the SQL before verification, which is not always feasible given the data privacy constraint. It is also not efficient and user-friendly for large databases.

For pre-execution verification, the generated SQL self-verifies before returning the SQL to the user or database. This method leverages self-consistency techniques in the Text2SQL generation, but only achieves 0.4% accuracy improvement while having a much higher cost.

Accordingly, there is a need to provide an efficient solution to overcome the above-mentioned limitations and to provide a method and system for verifying that a SQL query will generate the intended result and automatically revising the SQL query when the SQL query likely does not generate the intended result.

SUMMARY

The present disclosure, through one or more of its various aspects, embodiments, and/or specific features or sub-components, provides, inter alia, various systems, servers, devices, methods, media, programs, and platforms for verifying that a SQL query will generate the intended result and automatically revising the SQL query when the SQL query likely does not generate the intended result.

According to an aspect of the present disclosure, a method for verifying a SQL query is provided. The method is implemented by at least one processor. The method includes: receiving, by the at least one processor, a first request to retrieve first data that is accessible via a database; identifying, by the at least one processor, an intention of the first request; generating, by the at least one processor based on the first request, a first SQL query to retrieve the first data from the database; predicting, by the at least one processor based on the generated first SQL query, an output of the generated first SQL query; determining, by the at least one processor, whether the predicted output matches the identified intention of the first request; generating, by the at least one processor based on the determining of whether the predicted output matches the identified intention of the first request, a second SQL query to retrieve the first data that is accessible via the database, when the predicted output of the first SQL query does not match the identified intention of the first request.

The generating of the first SQL query may be performed by a first LLM.

The generating of the second SQL query may include prompting a second LLM to revise the generated first SQL query. The first LLM identifies at least one issue with the generated first SQL query and the second LLM adjusts at least one input parameter, based on the identified at least one issue, for the generating of the second SQL query.

The determining of whether the predicted output matches the identified intention of the first request may include using a second LLM that uses a schema of the database and the generated first SQL query to predict an output description; and using a third LLM that uses the identified intention of the first request and the predicted output description for the determining of whether the predicted output matches the identified intention of the first request.

The determining of whether the predicted output matches the identified intention of the first request may include: using a second LLM to generate, based on a schema of the database and the first request, sample values; predicting, by the second LLM based on the generated sample values, the schema of the database, and the generated first SQL query, an answer to the first request; using a third LLM to generate, based on the generated sample values, the schema of the database, and the generated first SQL query, simulated results of executing the generated first SQL query; and using a fourth LLM to determine, based on the predicted answer to the first request and the generated simulated results of executing the generated first SQL query, whether the predicted output matches the identified intention of the first request.

The second LLM may generate the sample values for a plurality of simulations.

The method may further include executing, by the at least one processor, a plurality of SQL verification processes on the generated first SQL query; generating, by the at least one processor based on the executing of the plurality of SQL verification processes, a respective prediction label for each result of the executing of the plurality of SQL verification processes; determining, by the at least one processor, a confidence score by aggregating each respective prediction label as a weighted sum, wherein the confidence score indicates a likelihood that the generated first SQL query successfully retrieves the first data.

The method may further include comparing, by the at least one processor, the confidence score to a predetermined threshold. The generating of the second SQL query may occur when the confidence score is lower than the predetermined threshold.

According to another aspect of the present disclosure, a computing apparatus for verifying a SQL query is provided. The computing apparatus includes a processor; a memory; a display; and a communication interface coupled to each of the processor, the memory, and the display. The processor is configured to: receive, via the communication interface, a first request to retrieve first data that is accessible via a database; identify an intention of the first request; generate, based on the first request, a first SQL query to retrieve the first data from the database; predict, based on the generated first SQL query, an output of the generated first SQL query; determine whether the predicted output matches the identified intention of the first request; and generate, based on the determining of whether the predicted output matches the identified intention of the first request, a second SQL query to retrieve the first data that is accessible via the database, when the predicted output does not match the identified intention of the first request.

The processor may be further configured to use a first LLM to generate the first SQL query.

The processor may be further configured to prompt a second LLM to revise the generated first SQL query when the predicted output does not match the identified intention of the first request. The first LLM identifies at least one issue with the generated first SQL query and the second LLM adjusts at least one input parameter, based on the identified at least one issue, to generate the second SQL query.

The processor may be further configured to: use a second LLM to predict, based on a schema of the database and the generated first SQL query, an output description; and use a third LLM to determine, based on the identified intention of the first request and the predicted output description, whether the predicted output matches the identified intention of the first request.

The processor may be further configured to: use a second LLM to generate, based on a schema of the database and the first request, sample values; predict, by the second LLM based on the generated sample values, the schema of the database, and the generated first SQL query, an answer to the first request; use a third LLM to generate, based on the generated sample values, the schema of the database, and the generated first SQL query, simulated results of executing the generated first SQL query; and use a fourth LLM to determine, based on the predicted answer to the first request and the generated simulated results of executing the generated first SQL query, whether the predicted output matches the identified intention of the first request.

The second LLM may generate the sample values for a plurality of simulations.

The processor may be further configured to: execute a plurality of SQL verification processes on the generated first SQL query; generate, based on the executing of the plurality of SQL verification processes, a respective prediction label for each result of the executing of the plurality of SQL verification processes; determine a confidence score by aggregating each respective prediction label as a weighted sum. The confidence score indicates the likelihood that the generated SQL verification process successfully retrieves the first data.

The processor may be further configured to: compare the confidence score to a predetermined threshold; and generate the second SQL query, when the confidence score is lower than the predetermined threshold.

According to yet another aspect of the present disclosure, a non-transitory computer readable storage medium storing instructions for verifying a SQL query is provided. The storage medium includes executable code which, when executed by a processor, causes the processor to: receive a first request to retrieve first data that is accessible via a database; identify an intention of the first request; generate, based on the first request, a first SQL query to retrieve the first data from the database; predict, based on the generated first SQL query, an output of the generated first SQL query; determine whether the predicted output matches the identified intention of the first request; and generate, based on the determining of whether the predicted output matches the identified intention of the first request, a second SQL query to retrieve the first data that is accessible via the database, when the predicted output does not match the identified intention of the first request.

The storage medium may be further configured to cause the processor to use a first LLM to generate the first SQL query.

The storage medium may be further configured to cause the processor to prompt a second LLM to revise the generated first SQL query when the predicted output does not match the identified intention of the first request. The first LLM may identify at least one issue with the generated first SQL query and the second LLM may adjust at least one input parameter, based on the identified at least one issue, to generate the second SQL query.

The storage medium may be further configured to cause the processor to: use a second LLM to predict, based on a schema of the database and the generated first SQL query, an output description; and use a third LLM to determine, based on the identified intention of the first request and the predicted output description, whether the predicted output matches the identified intention of the first request.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
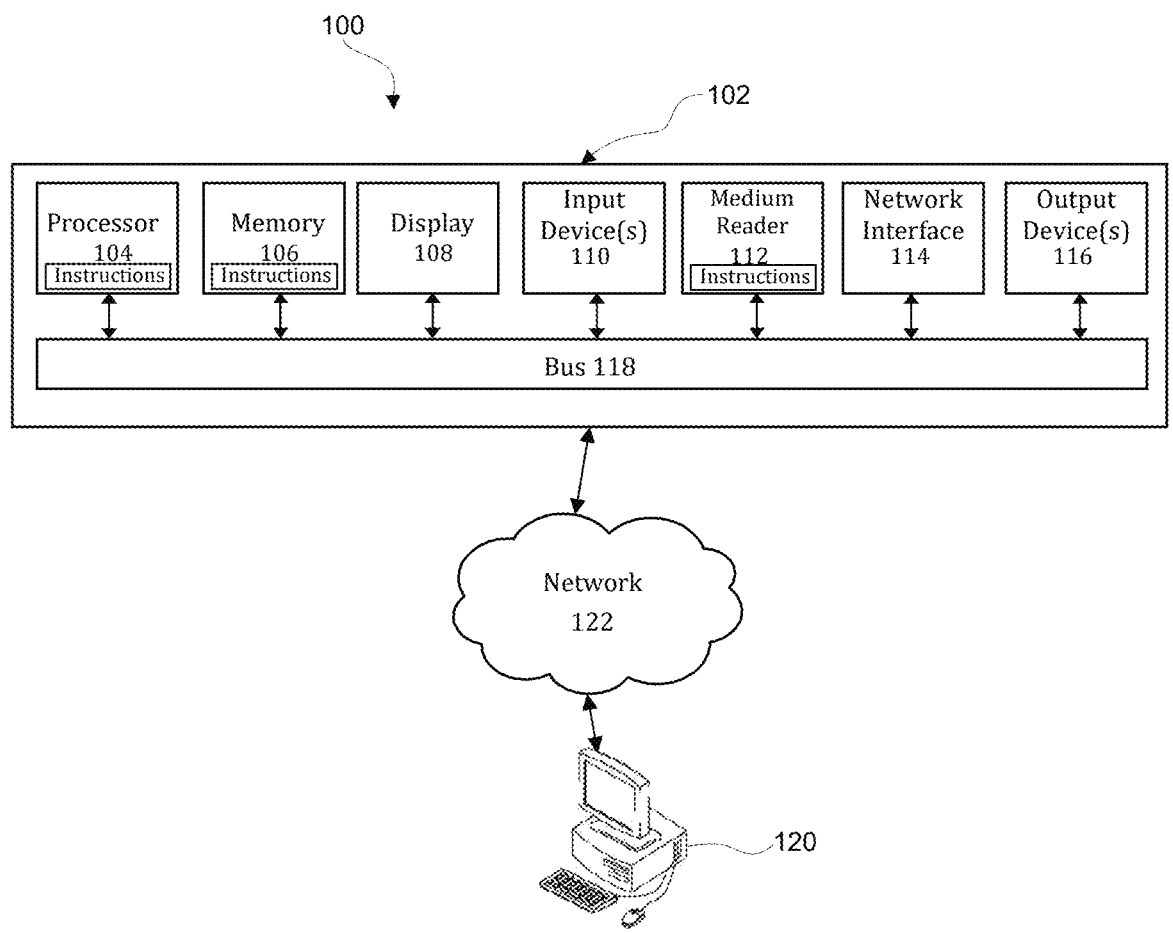
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for verifying that a SQL query will generate the intended result and automatically revising the SQL query when the SQL query likely does not generate the intended result.

Figure 2:
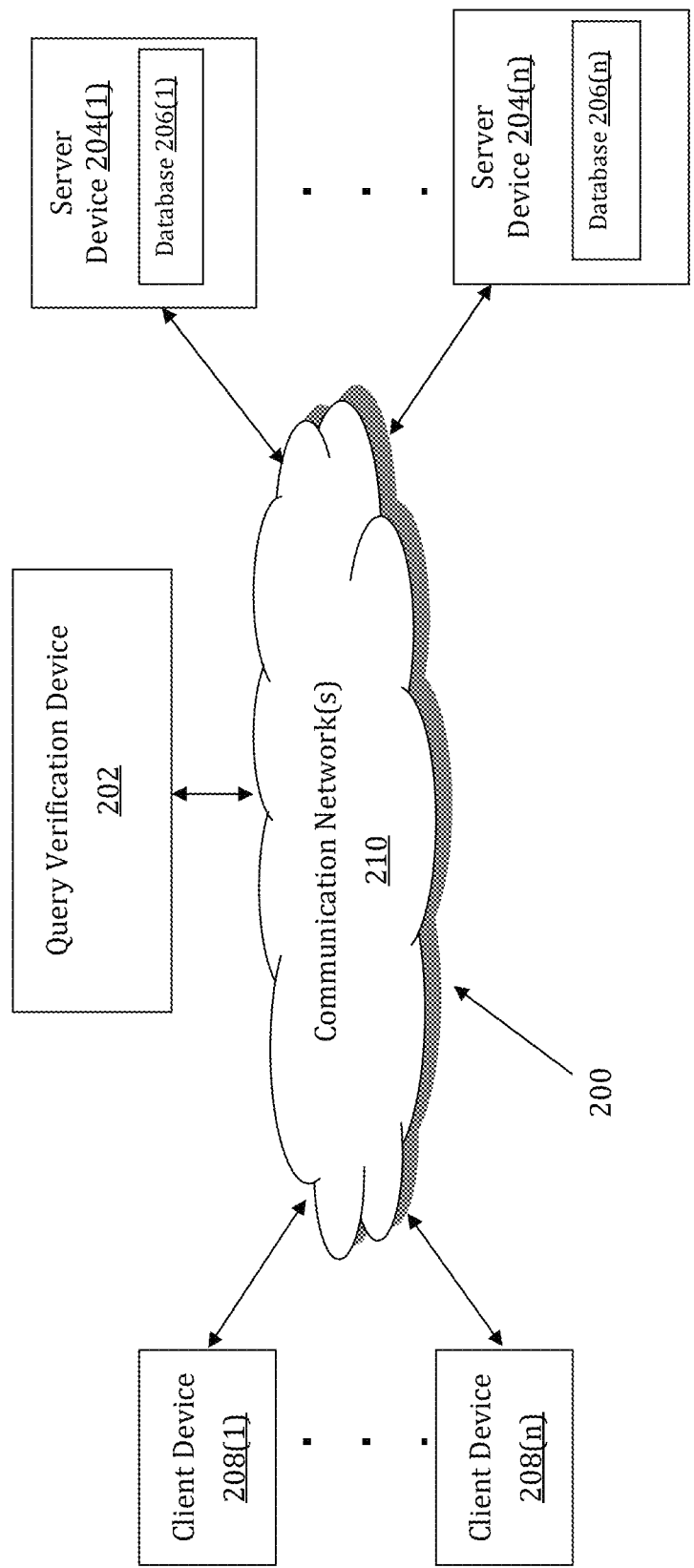
FIG. 2 illustrates an exemplary diagram of a network environment.

Referring to FIG. 2, a schematic of an exemplary network environment 200 for implementing a method for verifying that a SQL query will generate the intended result and automatically revising the SQL query when the SQL query likely does not generate the intended result is illustrated. In an exemplary embodiment, the method is executable on any networked computer platform, such as, for example, a personal computer (PC).

The method for verifying that a SQL query will generate the intended result and automatically revising the SQL query when the SQL query likely does not generate the intended result may be implemented by a query verification device 202. The query verification device 202 may be the same or similar to the computer system 102 as described with respect to FIG. 1. The query verification device 202 may store one or more applications that can include executable instructions that, when executed by the query verification device 202, cause the query verification device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the query verification device 202 itself, may be located in virtual server(s) running in a cloud-based computing environment rather than being tied to one or more specific physical network computing devices. Also, the application(s) may be running in one or more virtual machines (VMs) executing on the query verification device 202. Additionally, in one or more embodiments of this technology, virtual machine(s) running on the query verification device 202 may be managed or supervised by a hypervisor.

In the network environment 200 of FIG. 2, the query verification device 202 is coupled to a plurality of server devices 204(1)-204(n) that hosts a plurality of databases 206(1)-206(n), and also to a plurality of client devices 208(1)-208(n) via communication network(s) 210. A communication interface of the query verification device 202, such as the network interface 114 of the computer system 102 of FIG. 1, operatively couples and communicates between the query verification device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the query verification device 202, the server devices 204(1)-204(n), and/or the client devices 208(1)-208 (n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and query verification devices that efficiently implement a method for verifying that a SQL query will generate the intended result and automatically revising the SQL query when the SQL query likely does not generate the intended result.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The query verification device 202 may be a standalone device or integrated with one or more other devices or apparatuses, such as one or more of the server devices 204(1)-204(n), for example. In one particular example, the query verification device 202 may include or be hosted by one of the server devices 204(1)-204(n), and other arrangements are also possible. Moreover, one or more of the devices of the query verification device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the query verification device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to a time-series data repository and a MLP component database.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the query verification device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the query verification device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the query verification device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the query verification device 202, the server devices 204(1)-204(n), or the client devices 208(1)-208(n), for example, may be configured to operate as virtual instances on the same physical machine. In other words, one or more of the query verification devices 202, the server devices 204(1)-204(n), or the client devices 208(1)-208(n) may operate on the same physical device rather than as separate devices communicating through communication network(s) 210. Additionally, there may be more or fewer query verification devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
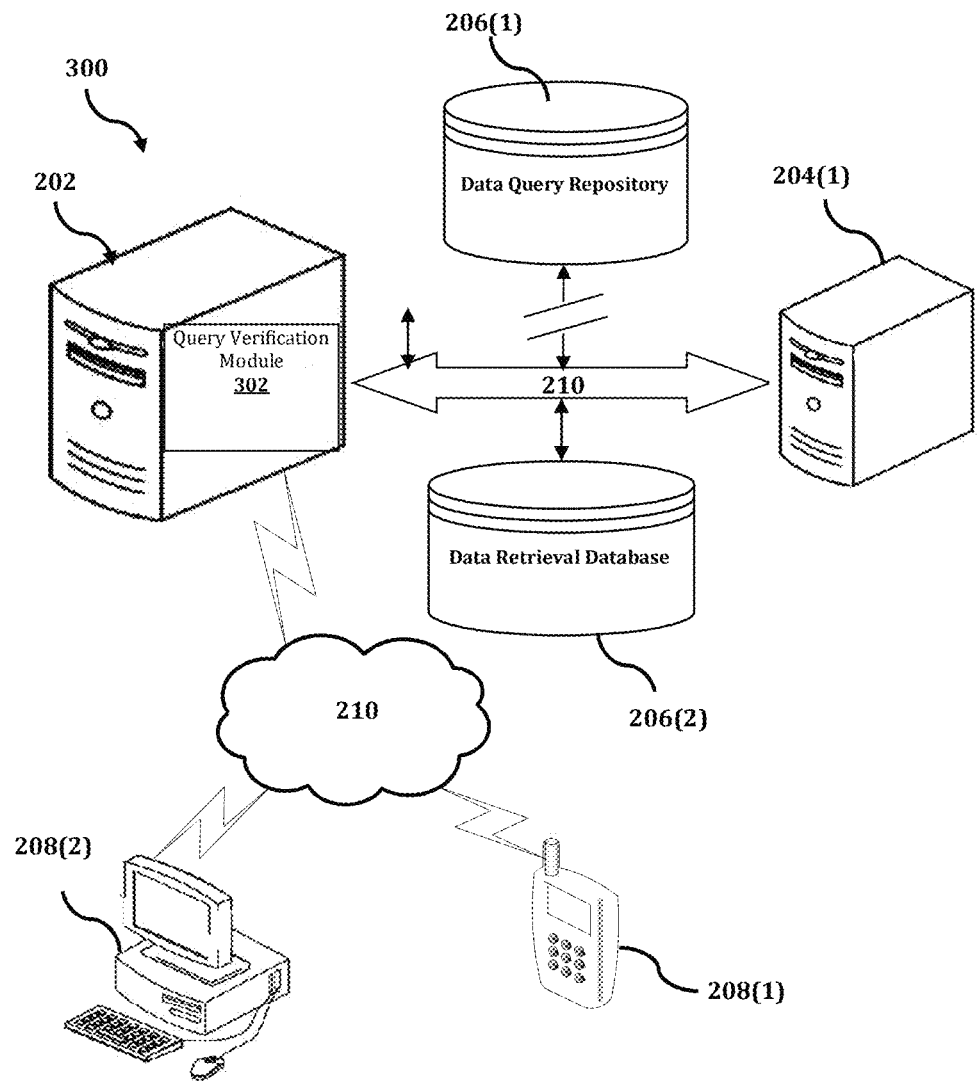
FIG. 3 shows an exemplary system for verifying that a SQL query will generate the intended result and automatically revising the SQL query when the SQL query likely does not generate the intended result.

The query verification device 202 is described and illustrated in FIG. 3 as including a query verification module 302, although it may include other rules, policies, modules, databases, or applications, for example. As will be described below, the query verification module 302 is configured to implement a method for verifying that a SQL query will generate the intended result and automatically revising the SQL query when the SQL query likely does not generate the intended result.

An exemplary process 300 for verifying that a SQL query will generate the intended result and automatically revising the SQL query when the SQL query likely does not generate the intended result by utilizing the network environment of FIG. 2 is illustrated as being executed in FIG. 3. Specifically, a first client device 208(1) and a second client device 208(2) are illustrated as being in communication with the query verification device 202. In this regard, the first client device 208(1) and the second client device 208(2) may be "clients" of the query verification device 202 and are described herein as such. Nevertheless, it is to be known and understood that the first client device 208(1) and/or the second client device 208(2) need not necessarily be "clients" of the query verification device 202, or any entity described in association therewith herein. Any additional or alternative relationship may exist between either or both of the first client device 208(1) and the second client device 208(2) and the query verification device 202, or no relationship may exist.

Further, the query verification device 202 is illustrated as being able to access a data query repository 206(1) and a data retrieval database 206(2). The query verification module 302 may be configured to access these databases for verifying that a SQL query will generate the intended result and automatically revising the SQL query when the SQL query likely does not generate the intended result.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the query verification device 202 via broadband or cellular communication. Of course, these embodiments are merely exemplary and are not limiting or exhaustive.

Upon being started, the query verification module 302 executes a process for verifying that a SQL query will generate the intended result and automatically revising the SQL query when the SQL query likely does not generate the intended result. An exemplary process for verifying that a SQL query will generate the intended result and automatically revising the SQL query when the SQL query likely does not generate the intended result is generally indicated at flowchart 400 in FIG. 4.

Figure 4:
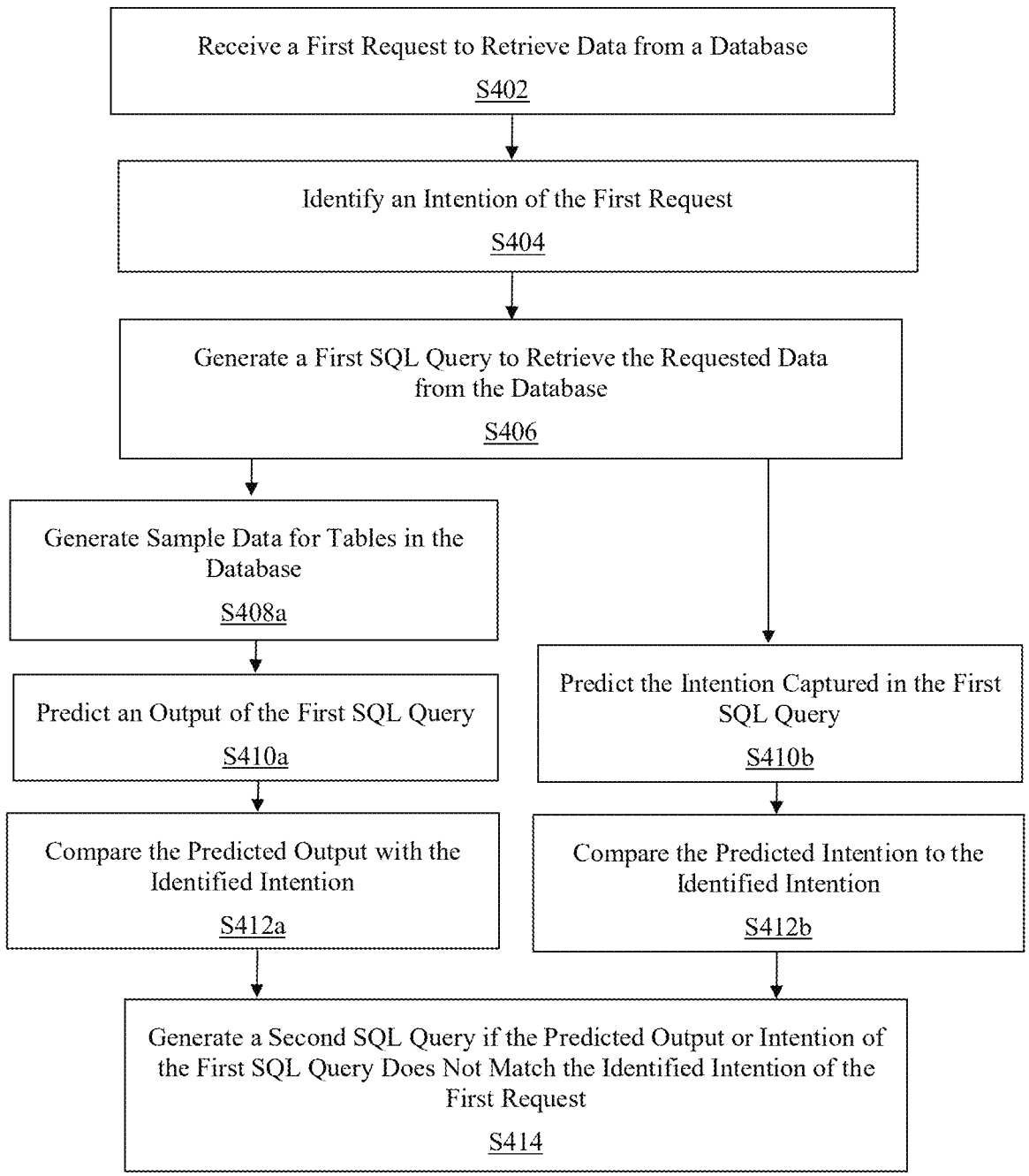
FIG. 4 is a flowchart of an exemplary process for implementing a method for verifying that a SQL query will generate the intended result and automatically revising the SQL query when the SQL query likely does not generate the intended result.

In process 400 of FIG. 4, at step S402, the query verification module 302 receives a first request to retrieve data from a database. In an exemplary embodiment, the first request is a user's question or request to retrieve data in natural language.

At step S404, the query verification module 302 identifies the intention of the first request. In an exemplary embodiment, the query verification module 302 determines what is being requested by the user's natural language query and the intention refers to the type of data the user is trying to retrieve from the database.

At step S406, the query verification module 302 generates a first SQL query to retrieve the requested data from the database. In an exemplary embodiment, the generating of the SQL query is based on the user's natural language query. The generating of the SQL query may also be based on the database for which the data is being retrieved. In an exemplary embodiment, the generating of the first SQL query is performed by a first LLM.

Following step S406, the query verification module 302 may pursue two different approaches. In the first approach, at step S408a, the query verification module 302 generates sample data for tables in the database. Then, following step S408a, the query verification module 302 predicts the output of the generated first SQL query. In the second approach, following step S406, at step S410b, the query verification module 302 predicts the intention captured in the first SQL query. In an exemplary embodiment, access to the actual data or execution in the actual database is not required for the predicting steps. In an exemplary embodiment, the query verification module 302 applies a second LLM that uses the schema of the database and the generated first SQL query to determine a description of the prediction. In another exemplary embodiment, the query verification module 302 applies a second LLM that uses the schema of the database and the first request to generate sample values and then predict an answer to the first request by using the sample values. The second LLM may generate sample values for a plurality of separate simulations. The query verification module 302 may then apply a third LLM that uses the generated sample values, the schema of the database, and the generated first SQL query for the predicting steps. The predictions may be in the form of simulated results of executing the SQL on the sample values. The first LLM, the second LLM, and the third LLM may each be separate components.

For the first approach, at step S412a, the query verification module 302 compares the predicted output of the first SQL Query with the identified intention of the first request to determine whether they match. For the second approach, at step S412b, the query verification module 302 compares the predicted intention of the first SQL query with the identified intention of the first request to determine whether they match. In an exemplary embodiment, the query verification module 302 applies a third LLM that uses the determined description of the predicted output or intention and the first request to determine whether the predicted output or intention of the first SQL query matches the identified intention of the first request. In another exemplary embodiment, the query verification module 302 applies a fourth LLM that uses the predicted answer to the first request and the simulated results of executing the first SQL on the sample values to determine whether the predicted output or intention of the first SQL query matches the identified intention of the first request. The first LLM, the second LLM, the third LLM, and the fourth LLM may each be separate components.

Then, at step S414, the query verification module 302 generates a second SQL query, if the predicted output or intention of the first SQL query does not match the identified intention of the first request. In an exemplary embodiment, the query verification module 302 applies a second LLM to revise the generated first SQL query. The first LLM may identify at least one issue with the generated first SQL query, and the second LLM may adjust input parameters, based on the identified at least one issue, to generate the second SQL query. In an exemplary embodiment, each of the steps can be iteratively performed until the predicted output or intention of a generated SQL query matches the identified intention of the first request.

In an exemplary embodiment, a plurality of SQL verification processes may be executed on the generated first SQL query. The query verification module 302 may generate respective prediction labels for each SQL verification process result. The query verification module 302 may aggregate each respective prediction label as a weighted sum to determine a confidence score that indicates the likelihood that the generated first SQL query successfully retrieves the first data. The query verification module 302 may then compare the confidence score to a predetermined threshold. In an exemplary embodiment, the query verification module 302 generates the second SQL query when the confidence score is lower than the predetermined threshold.

LLMs are shown to be powerful for translating natural language questions into SQL queries, making the interaction with databases more accessible to normal users. However, LLMs are still suboptimal in large datasets and complex queries. Many challenges exist in the deployment of LLMs for real-world applications, including correctness, interpretability, and data privacy.

Regarding correctness, the SQL queries generated by LLMs are not guaranteed to be correct. As a result, end users may still need to manually check the SQL or even the returned data, which does not really reduce human effort as expected in the data query process. Regarding interpretability, it is important to provide proper explanations, not only for the SQL itself, but also for how confident the model is in its correctness. And with regard to data privacy, real-world databases can be extremely confidential, while feeding the actual data into an external LLM can be risky and infeasible.

To address these challenges, an LLM-based self-verification approach is utilized to automatically investigate the generated SQL from multiple perspectives, provide explanations, and improve the SQL before returning to the user. This approach only takes the meta data and user question as input, and does not require access to the actual data or execution in the actual database.

The query verification module 302 utilizes a pre-execution verification method. Compared to direct refinement by simple prompting or CoT prompting, the query verification module 302 catches more complex errors and renders better verification and improvement results, via a novel verification pipeline. Compared to after-execution verification, the query verification module 302 does not require access to the actual database and automatically verifies with LLMs, resulting in better user experience and wider applicability. Compared to existing pre-execution verification type methods, the query verification module 302 achieves higher performance and better interpretability.

In an exemplary embodiment, the query verification module 302 applies a pre-execution SQL verification method that identifies the correctness of any generated SQL given user questions in natural language. The query verification module 302 may also apply an SQL improvement method that refines the generated SQL when it is verified to be potentially wrong.

In an exemplary embodiment, the verification method is fully automated and needs no access to the actual database. The verification method may be referred to as forward-backward verification. In forward-backward verification the LLM separately checks what the generated SQL can do (forward), and whether what it does matches the user question (backward). Different from prior methods that give the LLM the generated SQL and the question all at once, the forward and backward are divided into two independent components, which may be referred to as Division of Thought (similar to a judge who makes decisions after listening to the statements of both the plaintiff and the defendant separately). The forward-backward verification approach may be implemented in various ways.

A first approach referred to as FB-Verbal includes two steps: (1) forward prediction: the first LLM takes in <db_schema, generated_sql> and returns a description of what the output would be (e.g. the average math score of grade 1 students); and (2) backward verification: the second LLM then takes <output_description, user_query> and decides whether the output matches the intention of the user query.

A second approach referred to as FB-Sim includes three steps: (1) user question forward prediction: an LLM takes in <db_schema, user_query>, first generates sample values, and then predicts the answer to the user question, saved as "user_question_answer"; (2) SQL forward prediction: the second LLM takes in <db_schema, sample_values, generated_sql> and returns the simulated results of executing the SQL on the sample table values, saved as "sql_answer"; and (3) backward verification: the third LLM then takes the simulated <user_question_answer, sql_answer> and decides whether they match each other. In an exemplary embodiment, during FB-Sim, sample values are generated for multiple (k) times, and the aggregated results are taken for a more comprehensive verification. These variants can be integrated as a generic framework FB(k), where k is the number of simulations. For example, FB-Verbal would be FB(0).

Having the verification results, an LLM may improve the generated SQL and fix the potential errors. However, a big challenge is to avoid negative influence the LLM ruins an SQL that was originally correct. This is possible due to false negative predictions of the verification method. Since the focus is to verify and improve SQL queries before returning them to the user and before execution in the database, such negative predictions are inevitable. A stricter verifier will generate more false negatives (negative stands for SQL being predicted to be incorrect).

To avoid the problem of negative influence, an ensemble-based verification and improvement pipeline is provided. The ensemble-based verification and improvement pipeline runs multiple verification methods separately, and then aggregates the results to derive a confidence score. For each generated SQL, a verification method will either predict it as correct (label 1) or wrong (label 0). Then, the predictions are aggregated as a weighted sum, where the weight of each verifier can be set as its average precision over a validation set. The aggregated value is a number from 0-1, which is the confidence score. A high confidence score means that the ensemble of verification methods believe that the generated SQL is correct. A low confidence score means that the generated SQL is very possibly wrong. Only SQLs with low confidence scores will be further modified (with a predefined confidence threshold hyperparameter).

The provided forward-backward verification methods let LLMs analyze the user question and the generated SQL separately, achieving higher error recall rates than traditional verification methods in complex domains. The provided ensemble-based SQL improvement results in more advanced SQL correctness with full automation. The provided pipeline provides better interpretability with both a forward-backward explanation and a confidence score, which makes the generated results more user-friendly. The provided verification method is a novel framework with controllable strictness of verification, trading off true positive rate and true negative rate via the hyperparameter configuration (the number of forward simulations). The introduced SQL verification and improvement pipeline requires no human supervision, no data access, and no database execution. As a result, the pipeline is easy-to-use and widely applicable to real-world applications.

Accordingly, with this technology, an optimized process for verifying that a SQL query will generate the intended result and automatically revising the SQL query when the SQL query likely does not generate the intended result is provided.

Although the invention has been described with reference to several exemplary embodiments, it is understood that the words that have been used are words of description and illustration, rather than words of limitation. Changes may be made within the purview of the appended claims, as presently stated, and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

The invention claimed is:

1. A method for verifying a structured query language (SQL) query, the method being implemented by at least one processor, the method comprising:
   receiving, by the at least one processor, a first request to retrieve first data that is accessible via a database;
   identifying, by the at least one processor, an intention of the first request;
   generating, by the at least one processor via a first large language model (LLM), a first SQL query to retrieve the first data from the database, based on the first request;
   retrieving, by the at least one processor, schema information associated with the database;
   training, by the at least one processor, a second LLM model using the schema information;
   computing, by the at least one processor via the second LLM, sample values for a plurality of simulations, based on the schema information and the first SQL query;
   predicting, by the at least one processor via a third LLM, an output of the first SQL query, based on the sample values, the schema information, and the first SQL query;
   verifying, by the at least one processor, that the first SQL query corresponds to the identified intention of the first request based on whether the predicted output matches the identified intention of the first request; and
   generating, by the at least one processor and based on a result of the verifying, a second SQL query to retrieve the first data that is accessible via the database, when the predicted output of the first SQL query does not match the identified intention of the first request.

2. The method of claim 1, wherein the generating of the second SQL query comprises prompting a fourth LLM to revise the generated first SQL query, and wherein the third LLM identifies at least one issue with the generated first SQL query and the fourth LLM adjusts at least one input parameter, based on the identified at least one issue, for the generating of the second SQL query.

3. The method of claim 1, further comprising:
   predicting, by the at least one processor via the third LLM, an output description, based on the schema information and the first SQL query,
   wherein the verifying is based on the identified intention and the predicted output description.

4. The method of claim 1, further comprising:
   predicting, by the at least one processor via the third LLM, an answer to the first request, based on the sample values, the schema information, and the first SQL query;
   generating, by the at least one processor via the third LLM, simulated results of executing the generated first SQL query, based on the sample values, the schema information, and the first SQL query,
   wherein the verifying is based on the predicted answer and the generated simulated results.

5. The method of claim 4, wherein the third LLM generates the sample values for a plurality of simulations.

6. The method of claim 1, further comprising:
   executing, by the at least one processor, a plurality of SQL verification processes on the generated first SQL query;
   generating, by the at least one processor based on the executing of the plurality of SQL verification processes, a respective prediction label for each result of the executing of the plurality of SQL verification processes; and
   determining, by the at least one processor, a confidence score by aggregating each respective prediction label as a weighted sum, wherein the confidence score indicates a likelihood that the generated first SQL query successfully retrieves the first data.

7. The method of claim 6, further comprising:
   comparing, by the at least one processor, the confidence score to a predetermined threshold, and
   wherein the generating of the second SQL query occurs when the confidence score is lower than the predetermined threshold.

8. A computing apparatus for verifying a structured query language (SQL) query, the computing apparatus comprising:
   a processor;
   a memory; and
   a communication interface coupled to each of the processor and the memory,
   wherein the processor is configured to:
   receive, via the communication interface, a first request to retrieve first data that is accessible via a database;
   identify an intention of the first request;
   generate, via a first large language model (LLM), a first SQL query to retrieve the first data from the database, based on the first request;
   retrieve schema information associated with the database;
   train a second LLM model using the schema information;
   compute, via the second LLM, sample values for a plurality of simulations, based on the schema information and the first SQL query;
   predict, via a third LLM, an output of the first SQL query, based on the sample values, the schema information, and the first SQL query;
   verify that the first SQL query corresponds to the identified intention of the first request based on whether the predicted output matches the identified intention of the first request; and
   generate, based on a result of the verifying, a second SQL query to retrieve the first data that is accessible via the database, when the predicted output does not match the identified intention of the first request.

9. The computing apparatus of claim 8, wherein the processor is further configured to prompt a fourth LLM to revise the generated first SQL query when the predicted output does not match the identified intention of the first request, and wherein the third LLM identifies at least one issue with the generated first SQL query and the fourth LLM adjusts at least one input parameter, based on the identified at least one issue, to generate the second SQL query.

10. The computing apparatus of claim 8, wherein the processor is further configured to:
    predict, via the third LLM, an output description, based on the schema information and the first SQL query,
    wherein the verifying is based on the identified intention and the predicted output description.

11. The computing apparatus of claim 8, wherein the processor is further configured to:
    predict, by the third LLM, an answer to the first request, based on the sample values, the schema information, and the first SQL query;
    generate, via the third LLM, simulated results of executing the generated first SQL query, based on the sample values, the schema information, and the first SQL query,
    wherein the verifying is based on the predicted answer and the generated simulated results.

12. The computing apparatus of claim 11, wherein the third LLM generates the sample values for a plurality of simulations.

13. The computing apparatus of claim 8, wherein the processor is further configured to:
   execute a plurality of SQL verification processes on the generated first SQL query;
   generate, based on the executing of the plurality of SQL verification processes, a respective prediction label for each result of the executing of the plurality of SQL verification processes; and
   determine a confidence score by aggregating each respective prediction label as a weighted sum, wherein the confidence score indicates the likelihood that the generated SQL verification process successfully retrieves the first data.

14. The computing apparatus of claim 13, wherein the processor is further configured to:
   compare the confidence score to a predetermined threshold; and
   generate the second SQL query, when the confidence score is lower than the predetermined threshold.

15. A non-transitory computer readable storage medium storing instructions for verifying a structured query language (SQL) query, the storage medium comprising executable code which, when executed by a processor, causes the processor to:
   receive a first request to retrieve first data that is accessible via a database;
   identify an intention of the first request;
   generate, via a first large language model (LLM), a first SQL query to retrieve the first data from the database, based on the first request;
   retrieve schema information associated with the database;
   train a second LLM model using the schema information;
   compute, via the second LLM, sample values for a plurality of simulations, based on the schema information and the first SQL query;
   predict, via a third LLM, an output of the first SQL query, based on the sample values, the schema information, and the first SQL query;
   verify that the first SQL query corresponds to the identified intention of the first request based on whether the predicted output matches the identified intention of the first request; and
   generate, based on a result of the verifying, a second SQL query to retrieve the first data that is accessible via the database, when the predicted output does not match the identified intention of the first request.

16. The storage medium of claim 15, wherein the executable code is further configured to cause the processor to prompt a fourth LLM to revise the generated first SQL query when the predicted output does not match the identified intention of the first request, and wherein the third LLM identifies at least one issue with the generated first SQL query and the fourth LLM adjusts at least one input parameter, based on the identified at least one issue, to generate the second SQL query.

17. The storage medium of claim 15, wherein the executable code is further configured to cause the processor to:
   predict, via the third LLM, an output description, based on the schema information and the first SQL query,
wherein the verifying is based on the identified intention and the predicted output description.

* * * * *